United States Patent [19]

Lepine

[11] Patent Number: 5,792,501
[45] Date of Patent: Aug. 11, 1998

[54] QUEEN'S MILK REPLACER

[75] Inventor: Allan Lepine, Lewisburg, Ohio

[73] Assignee: The Iams Company, Dayton, Ohio

[21] Appl. No.: 633,869

[22] Filed: Apr. 15, 1996

[51] Int. Cl.$^6$ ................................... A23C 17/00
[52] U.S. Cl. .................. 426/583; 426/588; 426/805
[58] Field of Search ......................... 426/580, 583, 426/588, 602, 613, 648, 801, 805

[56] References Cited

U.S. PATENT DOCUMENTS

| | | | |
|---|---|---|---|
| 4,337,278 | 6/1982 | Brog | 426/583 |
| 4,397,927 | 8/1983 | Brog | 426/583 |
| 5,290,571 | 3/1994 | Bounous et al. | 424/535 |

OTHER PUBLICATIONS

Official Publication of the Fed. of American Societies for Experimental Biology, *The FASEB Journal*, Apr. 1995, vol. 9, No. 4, Animal Nutrition (Sections 5905–5908).

Zicker, Steven C., DVM, Phd et al, *Composition of Cat (Felis Domestica) Milk During Lactation*, The Iams Company, pp. 2–21.

*Primary Examiner*—David A. Redding
*Attorney, Agent, or Firm*—Killworth, Gottman, Hagan & Schaeff LLP

[57] ABSTRACT

An artificially produced feline milk substitute composition is provided. The composition comprises casein, whey, and as expressed on a dry matter basis, from about 30 to about 50 percent protein, from about 25 to about 50 percent fat, and from about 10 to about 25 percent lactose. The casein and whey in the composition have a ratio of about 1:1.

20 Claims, 6 Drawing Sheets

QUEEN'S MILK REPLACER

BACKGROUND OF THE INVENTION

This invention relates to a queen's milk replacer, also referred to as a feline milk substitute, which substantially supplies the nutrient needs of nursing kittens.

According to recent studies, the domestic cat has become the most popular house pet in the United States. This increased popularity has focused attention on the nutritional requirements of adult cats and growing kittens. Although much research has been performed on weaned kittens and adult cats, very little information has been acquired on the composition of cat milk and how it may meet any unusual metabolic demands of the suckling kitten.

It is generally accepted that optimal nutrition of the suckling neonate is provided by milk from the lactating mother. Therefore, milk replacers have been formulated to reflect the nutrient composition of that species' milk. In the case of the orphaned kitten, most of the commercial and home-made formulations are based on studies that concentrated on total protein and fat percentages. The resultant rearing of orphan kittens with current milk replacers has met with several complications including cataracts, diarrhea, poor weight gain, and intolerance of the diet. Apparently, these defects are the result of inadequate nourishment of the suckling kitten.

Current queen's milk replacers have been formulated using upon a limited information base. Knowledge of total protein and fat concentrations in milk is not sufficient to allow the construction of an ingredient matrix sufficient to ensure provision of adequate nutrients to the nursing kitten. Therefore, a need still exists for a queen's milk replacer which duplicates feline milk more closely than currently available products and which substantially supplies the nutrient needs of nursing kittens.

SUMMARY OF THE INVENTION

The present invention meets that need by providing a queen's milk substitute having a casein to whey ratio which is not found in currently available products. Also, the queen's milk substitute of the present invention provides a fatty acid profile which is not found in currently available products. In addition, the queen's milk substitute of the present invention provides an amino acid profile which is not found in currently available queen's milk replacers.

In accordance with one aspect of the present invention, an artificially produced feline milk substitute composition is provided. The composition comprises casein, whey, and as expressed on a dry matter basis, from about 30 to about 50 percent protein, from about 25 to about 50 percent fat, and from about 10 to about 25 percent lactose. The casein and whey in the composition have a ratio of about 1:1. All percentages are reported on a weight basis unless otherwise indicated.

Preferably, the composition contains protein in amounts from about 35 percent to about 45 percent. More preferably, the composition contains protein in an amount of about 40 percent.

Preferably, the composition contains fat in amounts from about 30 percent to about 40 percent. More preferably, the composition contains fat in an amount of about 35 percent.

Preferably, the composition contains lactose in amounts from about 13 percent to about 20 percent. More preferably, the composition contains lactose in amounts from about 15 percent to about 17 percent.

The composition preferably further comprises arachidonic acid. Also, the composition preferably further comprises docosahexaenoic acid. In addition, the composition preferably further comprises butter oil, canola oil, and corn oil.

In accordance with another aspect of the present invention, an artificially produced feline milk substitute composition is provided. The composition comprises casein, whey, and expressed as a percentage of total fatty acids on a dry matter basis, from about 17 to about 20 percent linoleic acid, from about 0.5 to about 1.0 percent arachidonic acid, and from about 0.2 to about 0.4 percent docosahexaenoic acid.

Preferably, the linoleic acid in the composition is present in an amount of about 18 percent. Also, the composition preferably contains arachidonic acid in an amount of about 0.7 percent. In addition, the composition preferably contains docosahexaenoic acid in an amount of about 0.3 percent.

Preferably, the casein and the whey in the composition have a ratio of about 1:1 on a dry matter basis.

In accordance with another aspect of the present invention, an artificially produced feline milk substitute composition is provided. The composition comprises casein, whey, and expressed as a percentage of total essential amino acids on a dry matter basis, from about 4.0 to about 8.0 percent arginine, from about 1.0 to about 3.0 percent tryptophan, and from about 2.0 to about 5.0 percent valine.

Preferably, the arginine in the composition is present in an amount of about 6.5 percent. Also, the composition preferably contains tryptophan in an amount of about 1.7 percent. In addition, the composition preferably contains valine in an amount of about 3.7 percent.

Preferably, the casein and the whey in the composition have a ratio of about 1:1 on a dry matter basis.

Accordingly, it is a feature of the present invention to provide a feline milk substitute that duplicates feline milk more closely than currently available products and which substantially supplies the nutrient requirements of nursing kittens.

DETAILED DESCRIPTION OF THE PREFERRED EMBODIMENTS

Figure 1:
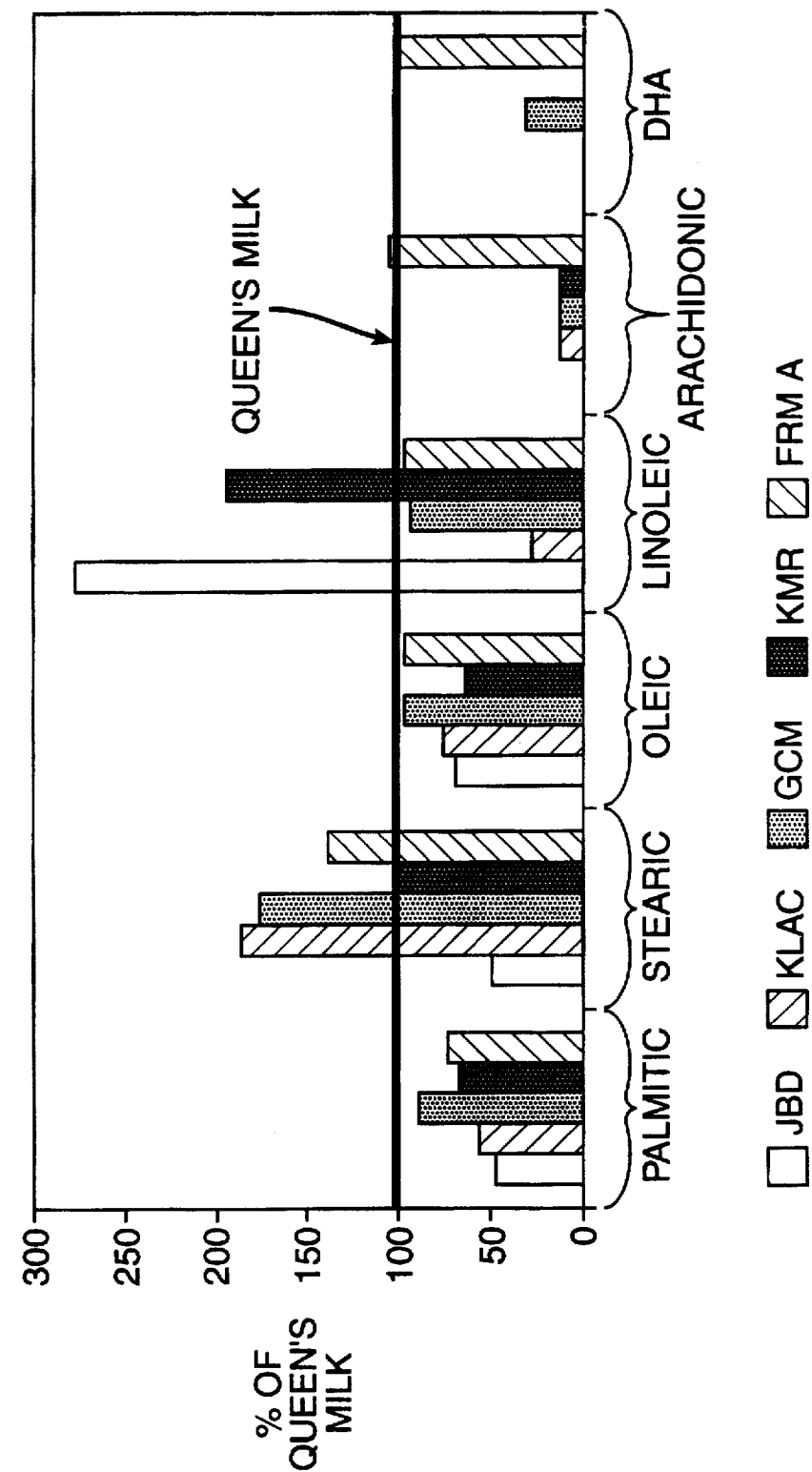
FIG. 1 is a bar graph showing the relative fatty acid adequacy of some current queen's milk replacers and the test formula of the present invention to queen's milk.

The present invention produces an improved queen's milk replacer which duplicates feline milk more closely than currently available products. To accomplish this, a careful study of queen's milk was undertaken. The testing procedures and results are described below.

Materials and Methods

Animals—The protocol was approved by the Committee for Animal Use and Care at UC Davis and conformed to AAALAC (American Association for Accreditation of Laboratory Animal Care) standards. Twelve lactating domestic short hair cats were given ad libitum access to a diet which exceeded AAFCO (1995) nutrient profiles for growth and reproduction.

Samples—Milk samples were obtained on days 1, 3, 7, 14, 28, and 42 days following parturition. Milk was obtained by manual expression of the gland after an intramuscular injection of 5 IU of oxytocin. Sample size usually was in excess of 1 mL. All samples were frozen at −20° C. until analysis.

Nitrogen Analysis—Aliquots of samples from six cats were analyzed for total nitrogen and NPN by micro-Kjeldahl analysis (Kjeltec Auto 1030 Analyzer, Tecator, Höganäs, Sweden). NPN samples were subjected to precipitation with 24% TCA, centrifuged for 15 min at 10,000 g, and the supernatant analyzed for nitrogen. True protein was calculated by subtracting NPN from total nitrogen and multiplying by a 6.25 conversion factor.

Polyacrylamide gradient gel electrophoresis (SDS-PAGGE)—Whole milk samples were diluted to 2 mg of protein/mL in sample buffer (15 mmol/L Tris pH 8.0, 10% SDS, 10% glycerol, 2.5 mmol/L 2-mercaptoethanol and 0.5% bromophenol blue). Dilute milk samples were heated in boiling water for 3 min prior to application on the gel. Twenty micrograms of protein were applied to each well of a 10–20% Daiichi minigel (Integrated Separation Systems, Natick, Mass.). Gels were run for 80 min at 35 mA in Tris-glycine buffer (0.025 mol/L Tris, 0.192 mol/L glycine, 1% SDS w/v, pH 8.3; Kodak Buffer EZE Formula 1, Eastman Kodak Co, Rochester, N.Y.). Gels were stained overnight with 300 ml of a solution containing acetic acid:ethanol:water (10:25:65 v:v:v) and 0.35 g of Coomassie Brilliant Blue for detection of proteins. Destaining with acetic acid:ethanol:water (10:25:65 v:v:v) was stopped when the background became clear.

Casein:whey ratio—Casein to whey ratio was estimated at each time point by integration of peaks obtained from a densitometric scan of milk proteins following SDS-PAGGE. Gels were scanned using a light densitometer with a 585 nm filter. Peaks were labelled and the area under each peak was computed (Hoefer Scanning Densitometer GS 370 Electrophoresis Data system, Hoefer Scientific Instruments, San Francisco, Calif.).

Amino Acids—Milk protein was hydrolyzed under argon gas by addition of 6N HCl and incubated for 24 h at 100° C. Samples were rotavaporized and resuspended in lithium diluting buffer. Samples were analyzed by detection of ninhydrin derivitzed acids on automated ion-exchange chromatography (Beckman 6300 Amino Acid Analyzer, Palo Alto, Calif.).

Samples for tryptophan determination were hydrolyzed under argon gas by addition of 4.3 N NaOH for 24 h at 100° C. Samples were then dried and tryptophan was determined by a modified method of Denkla & Dewey, "The determination of tryptophan in plasma, liver and urine" J. Lab Clin. Med. Vol. 69, pp. 160–163 (1967). Hydrolyzed milk samples (125 µl) were precipitated by addition of 1.875 ml of ice-cold 10% TCA and centrifugation at 3,000 g for 10 min. Samples were transferred to a new test tube and volume was corrected to 2.0 ml by addition of TCA to original weight. Addition of 0.2 ml 1.8% formaldehyde followed by addition of 0.1 ml of 6 nmoles/L $FeCl_3$ was performed just prior to incubation in a 100 C water bath for 1 h. Samples were measured on a spectrofluorometer with an excitation wavelength of 373 nm and an emission wavelength of 452 nm. Dilutions of 20 umoles/L tryptophan were used for a standard curve.

Total Lipids—Total lipids were determined by a modification of the phosphovanillinic acid method of Zollner and Kirsch, "Uber die quantitative Bestimmung von Lipoiden (allen bekannten Plasmalipoiden) gemeinsamen Sulfophosphovanillin-Reaktion" *Z Gesatmte Exp. Med.* Vol. 135, pp. 545–561 (1962). Milk samples were diluted 1:10 with 0.15 mol/L NaCl.

Lactose—Lactose was determined on 50 µl milk samples precipitated by addition of 1.0 ml $H_2O$, 0.5 ml $Ba(OH)_2$ (0.3 mol/L) and 0.5 ml of 5% $ZnSO_4$ and centrifugation at 3,000×g for 15 min. Supernatant (50 µl) was mixed with 1.0 ml of 0.1 mol/L sodium phosphate buffer, pH 7.3, and 5 µl of β-galactosidase (1500 U/ml, Boehringer-Mannheim, Indianapolis, Ind.) to digest lactose into glucose and galactose subunits. Samples were incubated for 1 h at 30° C. Glucose was determined in the digested samples (0.5 ml) by addition of 0.5 ml $H_2O$ and 2.0 ml of glucose oxidase reagent and measurement of absorbance at 450 nm (Dahlquist, 1964).

Citrate—Samples of milk (125 µl) were precipitated with an equal volume of ice cold percholoric acid (1 mol/L) and centrifuged at 10,000×g for 15 min. An aliquot of supernatant (200 µl) was removed and slowly neutralized with 100 µl of 0.3 mol/L potassium carbonate solution. The latter solution was incubated for 10 min at 0°–4° C. Concentration of citrate was determined in the neutralized solution using a commercial kit (Boehringer-Mannheim).

Minerals—Milk samples from a separate set of six cats were used for this analysis. Samples were digested with concentrated nitric acid. Concentrations of copper, iron, and zinc were determined by atomic absorption spectroscopy (AAS) (Thermo Jarrell Ash, Video 12E, Boston, Mass.) utilizing an acetylene flame. Calcium was determined on samples diluted with 0.1% lanthanum oxide by AAS using a nitrous oxide flame. Phosphorous was determined calorimetrically (Sigma, St. Louis, Mo.).

Statistics—Repeated measures ANOVA with 1 within factor (time) and no grouping factor were performed on each variable (SAS PROC GLM, SAS Institute, Cary, N.C.). Means±SEM were calculated for all values at each time point. Means were compared using Tukey's studentized range test (SAS PROC means). Significance was set at P=0.05.

Results

Protein and NPN—both true protein and NPN decreased in concentration from day 1 to day 3 and then increased gradually throughout the rest of lactation. Repeated measures ANOVA revealed a significant effect of time on the concentrations of true protein and NPN in milk during lactation. The ratio of casein to whey nitrogen increased slowly from 40:60 in the colostrum to 56:44 by the end of lactation. Separation of means by Tukey's test revealed significant differences of means of casein and whey percent over time.

Lactose—There was a significant effect of time on concentrations of lactose in milk during lactation. The lactose concentration in colostrum was 29.9 g/L, while it was ~39–42 g/L in mature milk.

Lipids—Concentrations of total lipid in milk decreased from colostrum to the subsequent sample at day 3. Concentrations of lipid then increased and were not significantly different from colostrum by means separation. Repeated measures ANOVA revealed a marginal (P=0.05) significant effect of time on this parameter.

Energy—Total energy content (calculated using physiological fuel values) during lactation decreased from colostrum (~1,300 kcal/L) to day 3 (850 kcal/L) but then gradually increased throughout lactation.

Minerals—Concentrations of calcium and phosphorous increased dramatically in milk up to day 14 and then remained at a constant concentration. The changes in concentrations of calcium and phosphorus were, however, of very different magnitude. Therefore, the Ca:P ratio changed from 0.4 in early lactation to 1.2 in late lactation. Magnesium concentrations in milk from days 3 to 42 were significantly lower than in colostrum.

Trace Elements—The concentration of iron in milk increased significantly from 1.85±0.3 mg/L on day 1 to 3.90±0.55 mg/L on day 3 and then decreased to concentrations similar to colostrum. Similarly, milk copper concentration increased from 0.36±0.07 mg/L on day 1 to 1.34±0.25 mg/L on day 3 and then decreased. In contrast, the concentration of zinc in milk did not change during lactation and was around 6–7 mg/L.

Citrate—Milk citrate concentrations were significantly higher at days 1 and 3 (5.8–6.5 mM) than at all other time points (3–4 mM).

Protein Composition—The casein content of colostrum as analyzed by gel electrophoresis was comparatively lower in than in mature milk. Two major casein subunits with molecular weights of ~28 and 33 kD were detected. The major components of cat whey had molecular weights of ~14, 19, 40 and 80 kD. Of these, the 40 kD protein was unusual in that it was absent in colostrum and then increased in concentration. Colostrum contained additional components with molecular weights of 24, 27 and 60 kD. The 80 kD protein decreased in concentration throughout lactation.

Amino Acids—Significant effects of time on concentrations of amino acids in milk protein were observed for all amino acids except for tryptophan, phenylalanine, and methionine. A marginal effect of time was observed for serine. Overall, the most significant differences were observed between colostrum and the subsequent samples.

It is believed that the important aspects impacting the development of the queen's milk replacement formula are the concentrations of true protein, total fat, and lactose, the casein to whey ratio, the amino acid profile, and the fatty acid profile. Although data was developed throughout the duration of lactation, only the data for day 7 of lactation are described below. Milk composition changes throughout the course of lactation, and it was determined that this early mature milk composition was the most appropriate data upon which to design a single milk replacer formulation. The data was most appropriate because the majority of kittens who are fed queen's milk replacers are very young. The queen's milk at day 7 of lactation can be reproduced artificially because it contains fewer antibodies than earlier queen's milk. The queen's milk produced in the first few days contains a large amount of antibodies. These antibodies cannot be reproduced artificially and produce high apparent levels of protein. Therefore, day 7 queen's milk is most appropriate because it is the earliest queen's milk that can be substantially duplicated artificially. All of the following data are presented on a dry matter basis. The percentages in the essential amino acid profile are expressed as a percentage of total essential amino acids. The percentages in the fatty acid profile are expressed as a percentage of total fatty acids.

| Protein | 40% |
| Fat | 35% |
| Lactose | 15–17% |
| Casein/Whey Ratio | 50:50 |

| Arginine | 6.20 |
| Histidine | 2.80 |
| Isoleucine | 3.27 |
| Leucine | 11.19 |
| Lysine | 6.57 |
| Methionine | 2.68 |
| Phenylalanine | 3.27 |
| Threonine | 4.81 |
| Tryptophan | 1.75 |
| Valine | 3.70 |

| Palmitic | 22.9 |
| Stearic | 5.9 |
| Oleic | 35.6 |
| Linoleic | 18.4 |
| Arachidonic | .70 |
| Docosahexaenoic | .30 |

Based on this data, the queen's milk replacer of the present invention was formulated. In one embodiment, the composition comprises casein, whey, and as expressed on a dry matter basis, from about 30 to about 50 percent protein, from about 25 to about 50 percent fat, and from about 10 to about 25 percent lactose. The casein and whey in the composition have a ratio of about 1:1.

Preferably, the composition contains protein in amounts from about 35 percent to about 45 percent. More preferably, the composition contains protein in an amount of about 40 percent.

Preferably, the composition contains fat in amounts from about 30 percent to about 40 percent. More preferably, the composition contains fat in an amount of about 35 percent.

Preferably, the composition contains lactose in amounts from about 13 percent to about 20 percent. More preferably, the composition contains lactose in amounts from about 15 percent to about 17 percent.

The composition preferably further comprises arachidonic acid. Also, the composition preferably further comprises docosahexaenoic acid. In addition, the composition preferably further comprises butter oil, canola oil, and corn oil.

The queen's milk replacer of the present invention may contain particular amounts of some fatty acids. Percentages are expressed as a percentage of total fatty acids on a dry matter basis. Linoleic acid is preferably present in amounts from about 17 to about 20 percent. More preferably, the linoleic acid in the composition is present in an amount of about 18 percent. Arachidonic acid is preferably present in amounts from about 0.5 to about 1.0 percent. More preferably, the composition contains arachidonic acid in an amount of about 0.7 percent. Also, docosahexaenoic acid is preferably present in amounts from about 0.2 to about 0.4 percent. More preferably, docosahexaenoic acid is present in an amount of about 0.3 percent.

In addition, other fatty acids are preferably present. Palmitic acid is preferably present in amounts from about 15 to about 25 percent. Stearic acid is preferably present in amounts from about 3 to about 9 percent. Oleic acid is preferably present in amounts from about 33 to about 38 percent.

The queen's milk replacer of the present invention may also contains particular amounts of some essential amino acids. Percentages are expressed as a percentage of total essential amino acids on a dry matter basis. Arginine is preferably present in amounts from about 4.0 to about 8.0 percent. Histidine is preferably present in amounts from about 2.0 to about 4.0 percent. Isoleucine is preferably present in amounts from about 2.0 to about 5.0 percent. Leucine is preferably present in amounts from about 8.0 to about 13.0 percent. Lysine is preferably present in amounts from about 5.0 to about 8.0 percent. Methionine is preferably present in amounts from about 1.0 to about 5.0 percent. Phenylalanine is preferably present in amounts from about 2.0 to about 6.0 percent. Threonine is preferably present in amounts from about 3.0 to about 7.0 percent. Tryptophan is preferably present in amounts from about 1.0 to about 3.0 percent. Valine is preferably present in amounts from about 2.0 to about 5.0 percent.

EXAMPLE

A queen's milk replacer was formulated based on the queen's milk data presented above. The formulation is as follows:

Formula A

| Ingredient | Percentage |
|---|---|
| Water | 79.900 |
| Whey Protein Concentrate | 4.875 |
| Na/Ca Caseinate | 4.875 |
| Butter Oil | 3.106 |
| Lactose | 2.950 |
| Canola Oil | 2.271 |
| Corn Oil | 1.152 |
| Magnesium Sulfate | 0.174 |
| Arginine | 0.156 |
| Fructooligosaccharide | 0.100 |
| Taurine | 0.100 |
| Arachidonic Acid Supplement | 0.100 |
| Sodium Chloride | 0.097 |
| Vitamin Premix | 0.057 |
| DHA Supplement | 0.050 |
| Mineral Premix | 0.028 |
| Ferrous Sulfate | 0.099 |

Formula A contains a "Vitamin Premix." This is a prepared composition containing a variety of vitamins. Specifically, the "Vitamin Premix" composition contains:

| Ingredient | Percentage |
|---|---|
| Dextrose | 76.82 |
| Vitamin E Supplement | 9.90 |
| Niacin | 2.93 |
| Ascorbic Acid | 2.87 |
| Vitamin A Acetate | 1.86 |
| Biotin Supplement | 1.80 |
| Calcium Pantothenate | 0.94 |
| Thiamine Hydrochloride | 0.82 |
| Pyridoxine Hydrochloride | 0.78 |
| Vitamin $B_{12}$ Supplement | 0.63 |
| Riboflavin Supplement | 0.21 |
| Inositol | 0.19 |
| Vitamin $D_3$ Supplement | 0.16 |
| Folic Acid | 0.09 |

Formula A also contains a "Mineral Premix." This is a prepared composition containing a variety of nutritional minerals. Specifically, the "Mineral Premix" composition contains:

| Ingredient | Percentage |
|---|---|
| Potassium Chloride | 74.00 |
| Zinc Sulfate | 12.95 |
| Copper Sulfate | 9.25 |
| Manganese Sulfate | 2.78 |
| Sodium Selenite | 0.92 |
| Potassium Iodide | 0.10 |

Fructooligosaccharide (FOS) was included in the formulation because studies have shown FOS to be beneficial to the intestinal health of many animals. FOS may be metabolized by beneficial intestinal bacterial species, such as *Bifidobacterium*. However, harmful intestinal bacteria, such as *Salmonella*, *E. coli* and *Clostridia*, are unable to process FOS. Therefore, FOS appear to promote a healthy intestinal environment in animals.

To determine the improvement of the present invention over currently available products, an analysis of several commercially available queen's milk replacer formulas was conducted. The tested formulas are Just Born® from Farnam Pet products (JBD), Kittylac® from CRP (KLAC), Golden Cat Milk™ from Onelac (GCM), and KMR® from PetAg (KMR). The fatty acid profiles and amino acid profiles of these products were analyzed using the techniques described above (see Materials and Methods). Also, the fatty acid profile and amino acid profile of the formula listed above (Formula A) was compared to queen's milk. The data is presented in Tables 1 and 2 below.

TABLE 1

Percentage of Fatty Acid Content Relative to Queen's Milk

| | Queen | JBD | KLAC | GCM | KMR | Formula A |
|---|---|---|---|---|---|---|
| Palmitic | 100 | 47 | 56 | 89 | 67 | 73 |
| Stearic | 100 | 49 | 186 | 176 | 103 | 139 |
| Oleic | 100 | 69 | 75 | 97 | 63 | 97 |
| Linoleic | 100 | 278 | 28 | 94 | 195 | 98 |
| Arachidonic | 100 | 0 | 14 | 14 | 14 | 106 |
| Docosahexaenoic | 100 | 0 | 0 | 33 | 0 | 100 |

TABLE 2

Percentage of Amino Acid Content Relative to Queen's Milk

| | Queen | JBD | KLAC | GCM | KMR | Formula A |
|---|---|---|---|---|---|---|
| Arginine | 100 | 77 | 55 | 60 | 68 | 110 |
| Histidine | 100 | 79 | 75 | 93 | 68 | 81 |
| Isoleucine | 100 | 126 | 119 | 135 | 119 | 142 |
| Leucine | 100 | 73 | 76 | 84 | 70 | 82 |
| Lysine | 100 | 93 | 98 | 103 | 83 | 100 |
| Methionine | 100 | 57 | 91 | 96 | 70 | 110 |
| Phenylalanine | 100 | 141 | 144 | 148 | 126 | 131 |

TABLE 2-continued

Percentage of Amino Acid Content Relative to Queen's Milk

|  | Queen | JBD | KLAC | GCM | KMR | Formula A |
|---|---|---|---|---|---|---|
| Threonine | 100 | 98 | 95 | 88 | 90 | 110 |
| Tryptophan | 100 | 35 | 18 | 29 | 29 | 91 |
| Valine | 100 | 153 | 150 | 167 | 153 | 104 |

Figure 2:
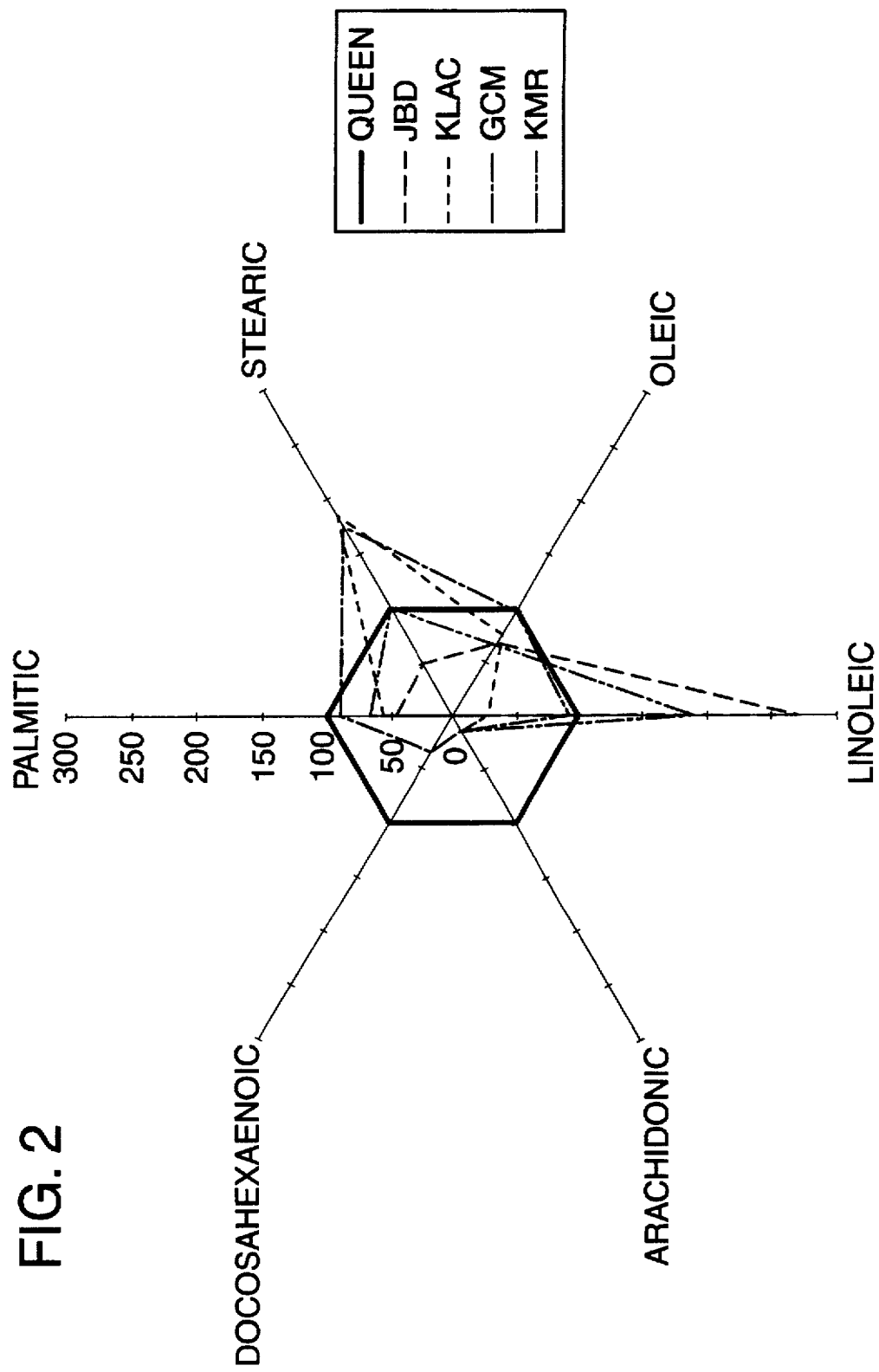
FIG. 2 is a radar plot of the data showing the relative fatty acid adequacy of some current queen's milk replacers to queen's milk.
Figure 3:
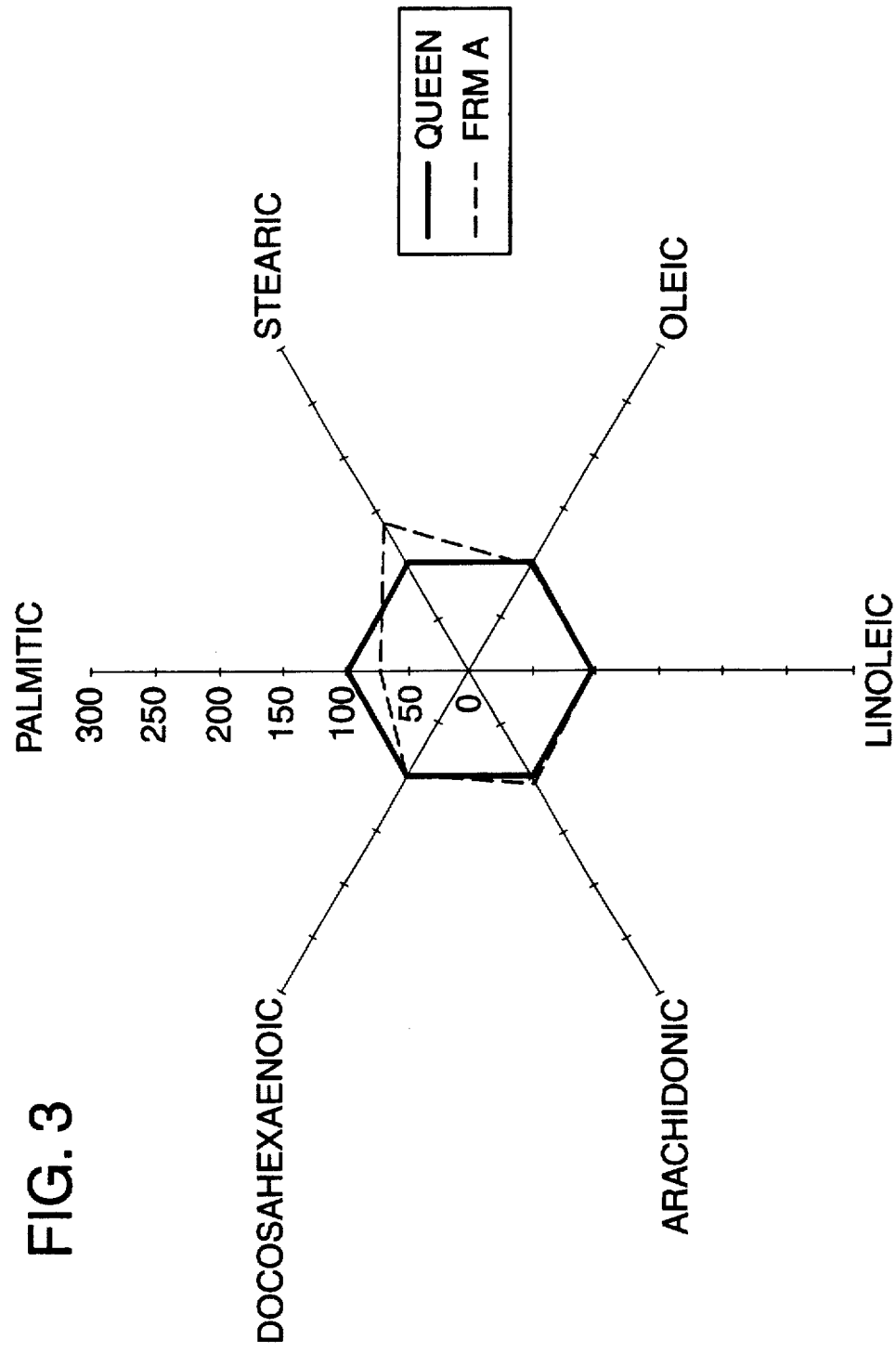
FIG. 3 is a radar plot of the data showing the relative fatty acid adequacy of the test formula of the present invention to queen's milk.

To clearly demonstrate the differences indicated by the above data, FIGS. 1–6 are presented. FIG. 1 is a bar graph of the data in Table 1 relating to fatty acid percentages. Note that the overall percentages of Formula A (Frm A) are much closer to queen's milk (100%) than the other products. FIGS. 2 and 3 clearly demonstrate this difference. FIG. 2 is a radar plot of the fatty acid data for the commercially available products compared to queen's milk. The heavy line (Queen) is indicative of queen's milk as the standard (i.e., 100%). Any product which falls inside or outside of this line is either deficient of in excess for that fatty acid relative to queen's milk. It is readily apparent that there are several fatty acids in each of these milk replacers which are not appropriately balanced. FIG. 3 is a radar plot of the fatty acid data for the formula of the present invention (Formula A) compared to queen's milk. Note that the shape of the fatty acid profile is much more similar to the queen's milk profile than any of the products in FIG. 2.

Figure 4:
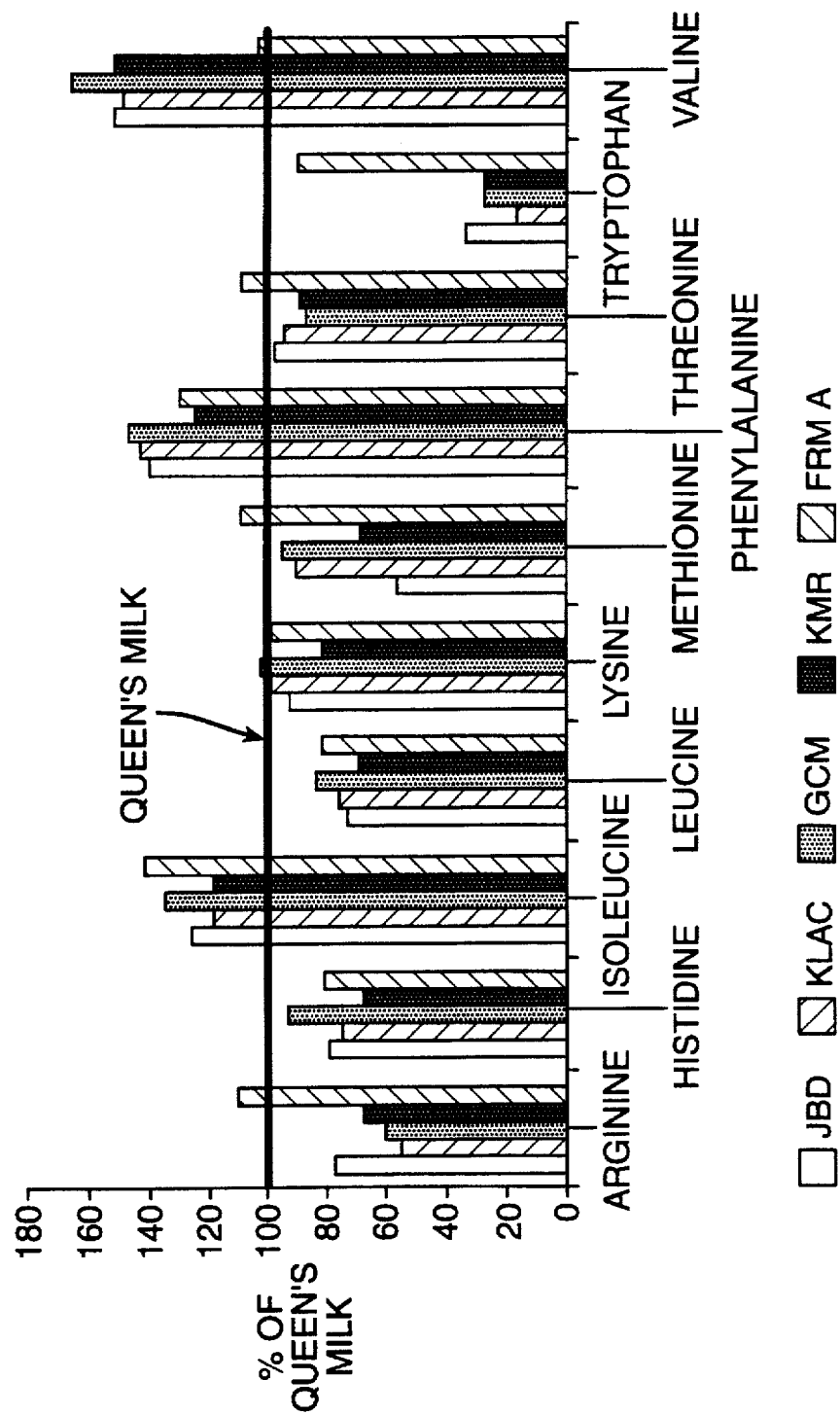
FIG. 4 is a bar graph showing the relative amino acid adequacy of some current queen's milk replacers and the test formula of the present invention to queen's milk.
Figure 5:
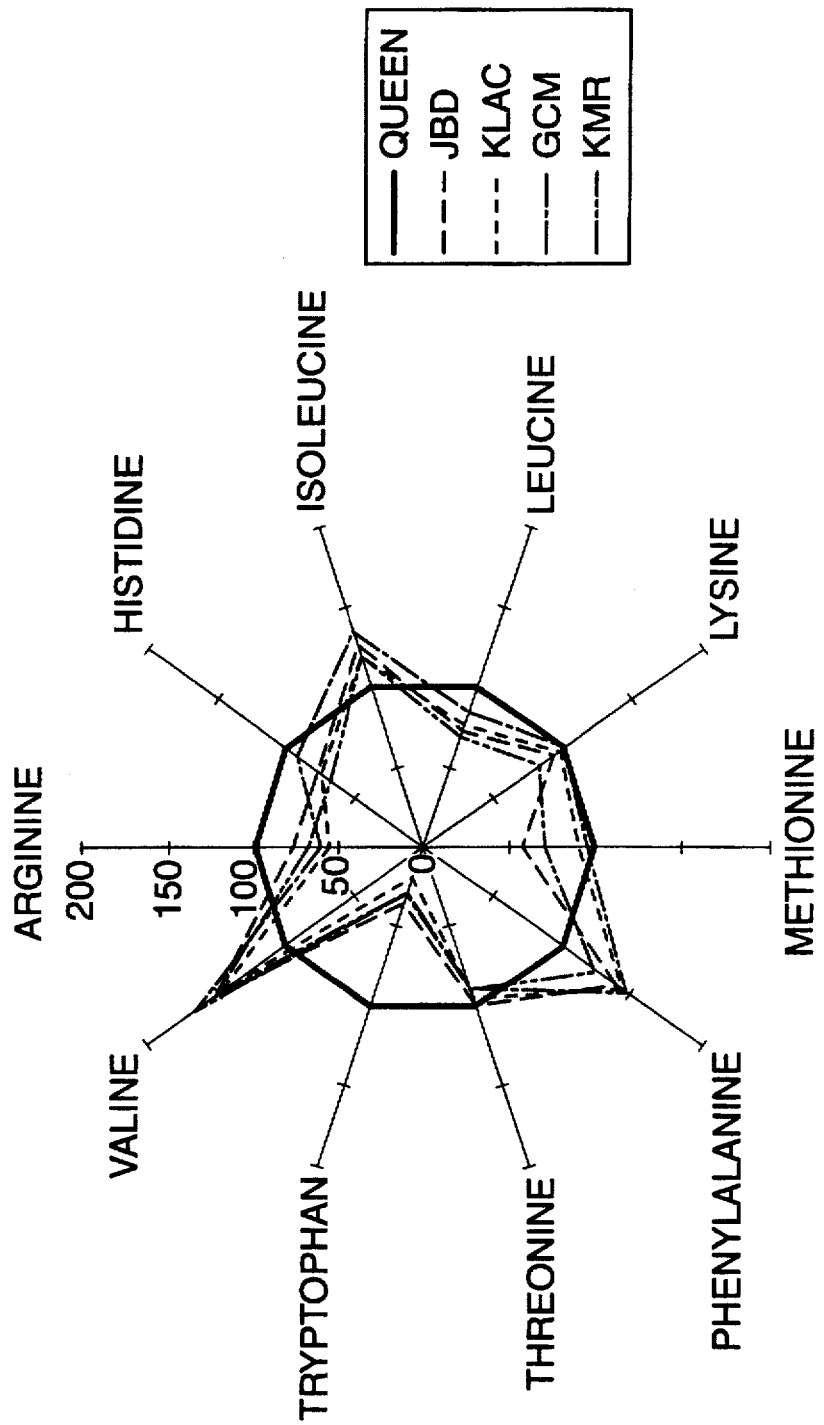
FIG. 5 is a radar plot of the data showing the relative amino acid adequacy of some current queen's milk replacers to queen's milk.
Figure 6:
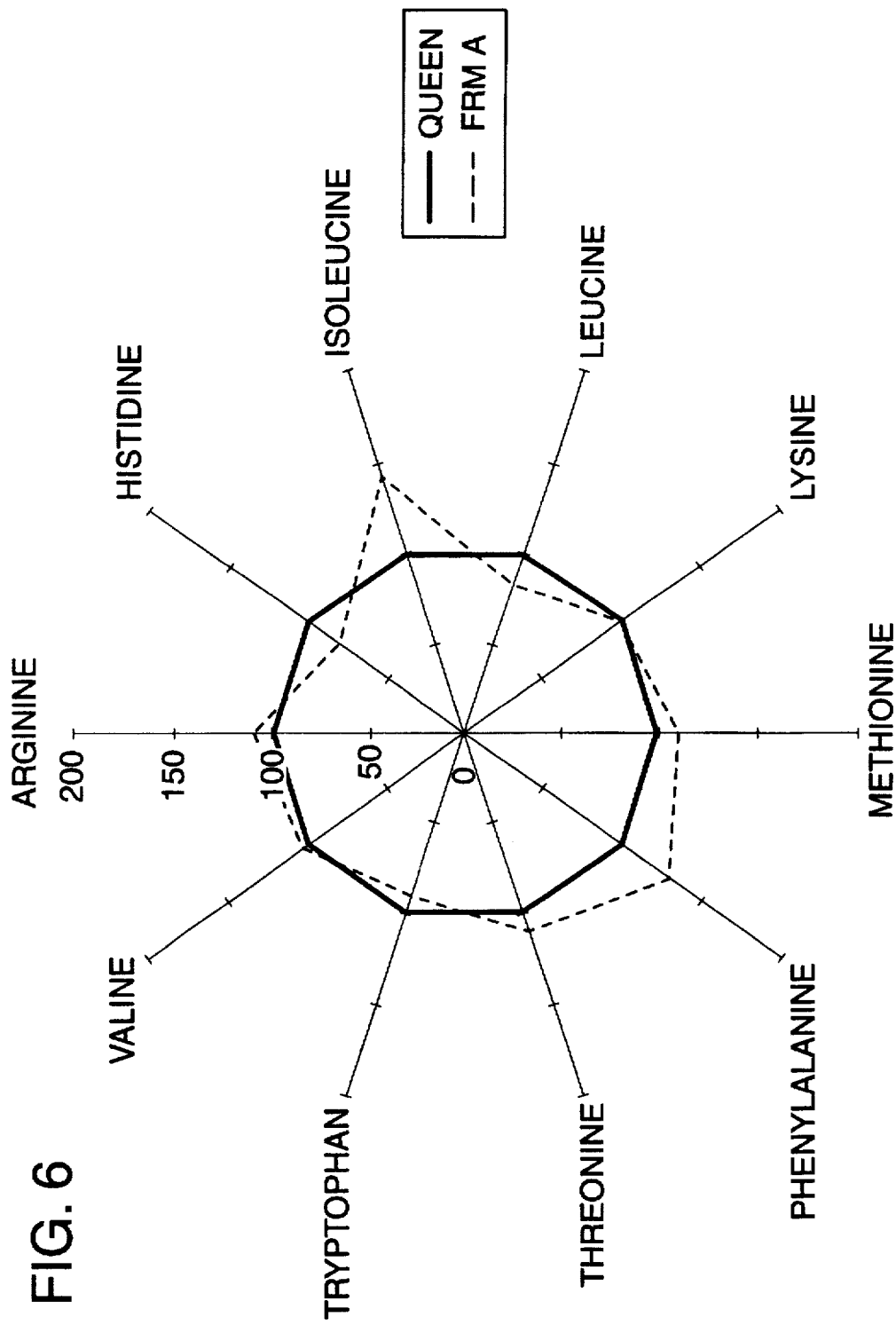
FIG. 6 is a radar plot of the data showing the relative amino acid adequacy of the test formula of the present invention to queen's milk.

FIGS. 4–6 are presented to demonstrate the differences in amino acid profiles indicated by the data in Table 2. FIG. 4 is a bar graph of the data in Table 2 relating to amino acid percentages. Note that the overall percentages of Formula A are much closer to queen's milk (100%) than the other products. FIGS. 5 and 6 clearly demonstrate this difference. FIG. 5 is a radar plot of the amino acid data for the commercially available products compared to queen's milk. As in FIGS. 2 and 3, the heavy line (Queen) is indicative of queen's milk as the standard (i.e., 100%). It is apparent that there are several amino acids in each of these milk replacers which are not appropriately balanced. FIG. 6 is a radar plot of the amino acid data for the formula of the present-invention (Formula A) compared to queen's milk. Note that the shape of the amino acid profile is much more similar to the queen's milk profile than any of the products in FIG. 5.

A preferred formulation for the queen's milk replacer of the present invention contains 40% protein, 35% fat and 15% lactose (plus 0.50% FOS) on a dry matter basis which closely matches the analytical data on queen's milk. The protein blend and the fat blend which are used in the product of the present invention will result in amino acid profiles and fatty acid profiles which are much improved as compared to those observed for other commercially available products. In addition, the presence of FOS should enhance the establishment of favorable intestinal microflora in the nursing kitten.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An artificially produced feline milk substitute composition comprising casein, whey, and as expressed on a dry matter basis, from about 30 to about 50 percent protein, from about 25 to about 50 percent fat, and from about 10 to about 25 percent lactose; wherein said casein and said whey have a ratio of about 1:1.

2. The composition of claim 1 wherein said protein is present in amounts from about 35 percent to about 45 percent.

3. The composition of claim 2 wherein said protein is present in an amount of about 40 percent.

4. The composition of claim 1 wherein said fat is present in amounts from about 30 percent to about 40 percent.

5. The composition of claim 4 wherein said fat is present in an amount of about 35 percent.

6. The composition of claim 1 wherein said lactose is present in amounts from about 13 percent to about 20 percent.

7. The composition of claim 6 wherein said lactose is present in amounts from about 15 percent to about 17 percent.

8. The composition of claim 1 further comprising arachidonic acid.

9. The composition of claim 1 further comprising docosahexaenoic acid.

10. The composition of claim 1 further comprising butter oil, canola oil, and corn oil.

11. An artificially produced feline milk substitute composition comprising casein, whey, and expressed as a percentage of total fatty acids on a dry matter basis, from about 17 to about 20 percent linoleic acid, from about 0.5 to about 1.0 percent arachidonic acid, and from about 0.2 to about 0.4 percent docosahexaenoic acid.

12. The composition of claim 11 wherein said linoleic acid is present in an amount of about 18 percent.

13. The composition of claim 11 wherein said arachidonic acid is present in an amount of about 0.7 percent.

14. The composition of claim 11 wherein said docosahexaenoic acid is present in an amount of about 0.3 percent.

15. The composition of claim 11 wherein said casein and said whey have a ratio of about 1:1 on a dry matter basis.

16. An artificially produced feline milk substitute composition comprising casein, whey, and expressed as a percentage of total essential amino acids on a dry matter basis, from about 4.0 to about 8.0 percent arginine, from about 1.0 to about 3.0 percent tryptophan, and from about 2.0 to about 5.0 percent valine.

17. The composition of claim 16 wherein said arginine is present in an amount of about 6.5 percent.

18. The composition of claim 16 wherein said tryptophan is present in an amount of about 1.7 percent.

19. The composition of claim 16 wherein said valine is present in an amount of about 3.7 percent.

20. The composition of claim 16 wherein said casein and said whey have a ratio of about 1:1 on a dry matter basis.

* * * * *